United States Patent
Oh et al.

(10) Patent No.: US 8,847,746 B2
(45) Date of Patent: Sep. 30, 2014

(54) IMAGE PROCESSING APPARATUS AND CONTROL METHOD THEREOF

(75) Inventors: Soohwan Oh, Yongin-Si (KR); Kyunggeun Kim, Seongnam-Si (KR); Sungha Choi, Seoul (KR); Sungah Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 364 days.

(21) Appl. No.: 13/253,712

(22) Filed: Oct. 5, 2011

(65) Prior Publication Data

US 2012/0242474 A1 Sep. 27, 2012

Related U.S. Application Data

(60) Provisional application No. 61/467,793, filed on Mar. 25, 2011.

(51) Int. Cl.
*B60Q 1/00* (2006.01)
*G01C 21/36* (2006.01)

(52) U.S. Cl.
CPC ................................ *G01C 21/3688* (2013.01)
USPC ........................................................ 340/441

(58) Field of Classification Search
USPC .......... 340/441, 438, 12.5, 13.24, 988, 425.5; 455/566, 569.2
See application file for complete search history.

(56) References Cited

U.S. PATENT DOCUMENTS

| | | |
|---|---|---|
| 2003/0156097 A1 | 8/2003 | Kakihara et al. |
| 2005/0143867 A1 | 6/2005 | Odinak et al. |
| 2005/0143912 A1* | 6/2005 | Park ............................... 701/209 |
| 2009/0079622 A1* | 3/2009 | Seshadri et al. ............ 342/357.1 |
| 2010/0117810 A1* | 5/2010 | Hagiwara et al. ........... 340/425.5 |
| 2010/0127996 A1 | 5/2010 | Kitahara et al. |
| 2011/0034128 A1* | 2/2011 | Kirsch .......................... 455/41.3 |
| 2013/0059547 A1* | 3/2013 | Kim et al. ....................... 455/73 |

FOREIGN PATENT DOCUMENTS

| | | | |
|---|---|---|---|
| KR | 10-2007-0043313 A | 4/2007 |
| KR | 10-2008-0018396 A | 2/2008 |
| KR | 10-2008-0051391 A | 6/2008 |
| KR | 10-2010-0108824 A | 10/2010 |

\* cited by examiner

*Primary Examiner* — Phung Nguyen
(74) *Attorney, Agent, or Firm* — Birch, Stewart, Kolasch & Birch, LLP

(57) ABSTRACT

An image display device is provided to receive a image corresponding to a program and identification information regarding the program from a mobile terminal, determine an image processing scheme with respect to the received image based on the identification information, and process the received image based on the determined image processing scheme, thus allowing a user to conveniently and effectively view the image provided from the mobile terminal in a stable environment in a vehicle. The image display device includes: a communication unit configured to receive an image corresponding to a program and identification information corresponding to the program from a mobile terminal; a controller configured to determine an image processing scheme corresponding to the received image based on the received identification information, and process the received image based on the determined image processing scheme; and a display unit configured to display the processed image.

24 Claims, 12 Drawing Sheets

(a)

(b)

(a)

(b)

(a)

(b)

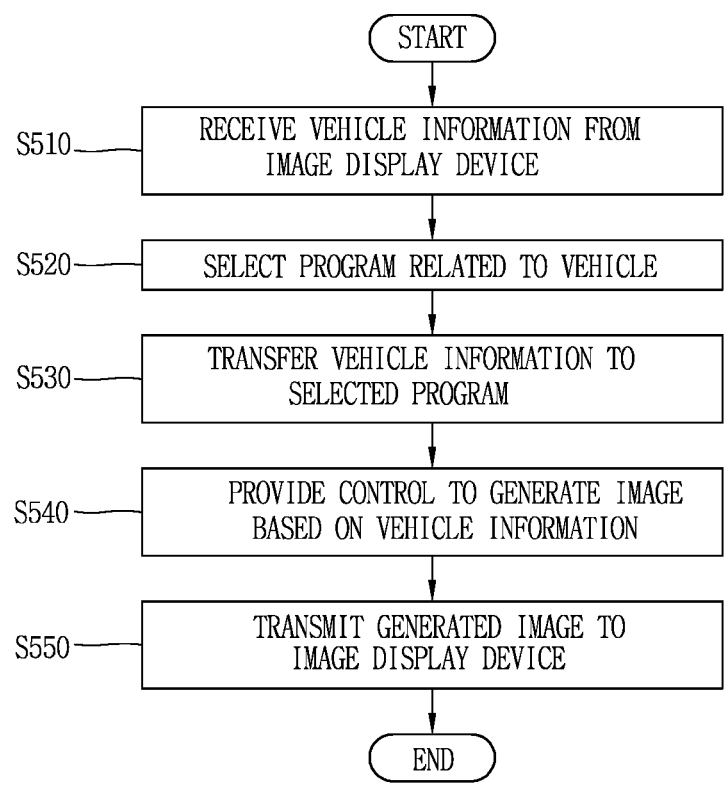

IMAGE PROCESSING APPARATUS AND CONTROL METHOD THEREOF

CROSS REFERENCE TO RELATED APPLICATIONS

Pursuant to 35 U.S.C. §119(e), this application claims the benefit of U.S. Provisional Application No. 61/467,793, filed on Mar. 25, 2011, the entire contents of which are hereby incorporated by reference in its entirety.

BACKGROUND OF THE INVENTION

1. Field of the Invention

The present invention relates to an electronic device and, more particularly, to a method for processing images in an image display device mounted in a vehicle, and an image display device and a mobile terminal providing the same.

2. Description of the Related Art

An image display device has a function of outputting images for users to view. Users may view images in a vehicle through the image display device mounted in the vehicle. The image display device mounted in the vehicle is able to receive images from an external device such as a mobile terminal in the vehicle through a fixed line or wirelessly to allow a user to view the received images.

SUMMARY OF THE INVENTION

Accordingly, an aspect of the present invention provides an image display device capable of receiving a image corresponding to a program and identification information regarding the program from a mobile terminal, determining an image processing scheme with respect to the received image based on the identification information, and processing the received image based on the determined image processing scheme, thus allowing a user to conveniently and effectively view the image provided from the mobile terminal in a stable environment in a vehicle.

Another aspect of the present invention provides a mobile terminal capable of receiving vehicle information regarding a state of a vehicle from an image display device and providing control to operate an application by using the received vehicle information, thus allowing a user to be provided with various services related to the vehicle.

To achieve these and other advantages and in accordance with the purpose of the present invention, as embodied and broadly described herein. The present invention provides in one aspect an image display device including: a communication unit configured to receive an image corresponding to a program and identification information corresponding to the program from a mobile terminal; a controller configured to determine an image processing scheme corresponding to the received image based on the received identification information, and process the received image based on the determined image processing scheme; and a display unit configured to display the processed image.

The controller may determine whether or not a state of the vehicle corresponds with travel regulation conditions, and when the state of the vehicle corresponds with the travel regulation conditions, the controller may process the received image according to the determined image processing scheme.

The travel regulation conditions may be that the speed of the vehicle is a predetermined speed or faster.

The image processing scheme may be a scheme of processing the received image such that a previously stored image is displayed in the place of the received image.

The previously stored image may include an indicator indicating the reason for displaying the previously stored image based on the identification information.

The identification information may include at least one of information regarding a type of the program, content of the program, and a user interface (UI) corresponding to the program.

The type of the program may be a program for executing a moving image or a program for transmitting and receiving a text message.

The content of the program may correspond to user's privacy.

The information regarding the UI corresponding to the program may be information regarding whether or not the program provides a UI or information regarding a component of the UI.

The image processing scheme may be a scheme of determining whether or not the UI provided by the program is an access limited subject, and when the UI is an access limited subject, the image processing scheme may be a scheme of processing to display a previously stored image.

The UI corresponding to the access limited subject may be a UI providing sub-menus having 3 depths or greater.

The image processing scheme may be a scheme of processing the received image such that the component corresponding to the UI is changed to be displayed on the image display device based on pre-set configuration information.

The changing of the component corresponding to the UI may be changing of at least any one of the color, shape, size, position, and direction of the component.

The device may further include: an input unit configured to receive a touch input corresponding to the changed component, wherein the controller may generate a signal for controlling the component corresponding to the UI based on the received touch input and control the communication unit to transmit the generated signal.

To achieve these and other advantages and in accordance with the purpose of the present invention, as embodied and broadly described herein, the present invention provides in another aspect a mobile terminal including: a communication unit configured to receive vehicle information from an image display device; and a controller configured to select a program related to a vehicle based on the vehicle information, transfer the vehicle information to the selected program, provide control to generate an image corresponding to the program based on the transferred vehicle information, and control the communication unit to transmit the generated image to the image display device.

The vehicle information may include at least any one of the type of the vehicle, the speed of the vehicle, information regarding vehicle supplies, and trouble information of the vehicle.

The controller may collect a list of vehicle information required for an operation from the program related to the vehicle, determine whether or not the received vehicle information is included in the list of vehicle information, and select the program related to the vehicle based on the determination results.

The controller may provide control to transmit the vehicle information to an external server providing a service related to the vehicle through the program, provide control to allow the program to receive the results obtained by processing the service related to the vehicle based on the vehicle information transmitted from the external server, and control the program to generate an image based on the processing results.

To achieve these and other advantages and in accordance with the purpose of the present invention, as embodied and broadly described herein, the present invention provides in another aspect a communication system including: a mobile terminal configured to transmit an image corresponding to a program and identification information corresponding to the program; and an image display device, provided in a vehicle, configured to determine an image processing scheme corresponding to the transmitted image based on the transmitted identification information, process the transmitted image according to the determined image processing scheme, and displaying the processed image.

To achieve these and other advantages and in accordance with the purpose of the present invention, as embodied and broadly described herein, the present invention provides in another aspect a display method including: receiving an image corresponding to a program and identification information corresponding to the program from a mobile terminal; determining an image processing scheme corresponding to the received image based on the received identification information; processing the received image according to the image processing scheme; and displaying the processed image.

According to an embodiment of the invention, there is an image display device configured to be installed in a vehicle and that includes: a display unit; a vehicle interface unit; a wireless communication unit; and a controller operatively connected to the display unit, the vehicle interface unit and the wireless communication unit. The controller configured to wirelessly receive, from a mobile terminal, data of a program being executed on the mobile terminal and corresponding program information, display the data on the display unit, receive vehicle status information from the vehicle interface unit, and change the display of the data of the program being executed on the mobile terminal based on the corresponding program information and the vehicle status information.

According to an embodiment of the invention, there is a method of controlling an image display device installed in a vehicle. The method includes: wirelessly receiving, from a mobile terminal, data of a program being executed on the mobile terminal and corresponding program information, displaying the data of the program being executed on the mobile terminal on the image display device, receiving vehicle status information, and changing the display of the data of the program being executed on the mobile terminal based on the corresponding program information and the vehicle status information.

According to an embodiment of the invention, there is a mobile terminal, that includes: a wireless communication unit; a display; and a controller operatively connected to the wireless communication unit and the display. The controller is configured to execute a program, wirelessly transmit data of the program to an image display device installed in a vehicle, receive vehicle status information from the vehicle, and control the data transmitted to the image display device based on corresponding program information and the received vehicle status information.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 12 is a flow chart illustrating the process of controlling an operation of the image display device according to the fourth embodiment of the present invention.

DETAILED DESCRIPTION OF THE INVENTION

Reference will now be made in detail to the preferred embodiments of the present invention, examples of which are illustrated in the accompanying drawings. In the following description, usage of suffixes such as 'module', 'part' or 'unit' used for referring to elements is given merely to facilitate explanation of the present invention, without having any significant meaning by itself.

The present invention will now be described more fully hereinafter with reference to the accompanying drawings, in which preferred embodiments of the invention are shown. This invention may, however, be embodied in many different forms and should not be construed as being limited to the embodiments set forth herein.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

Image Transmission System

Figure 1:
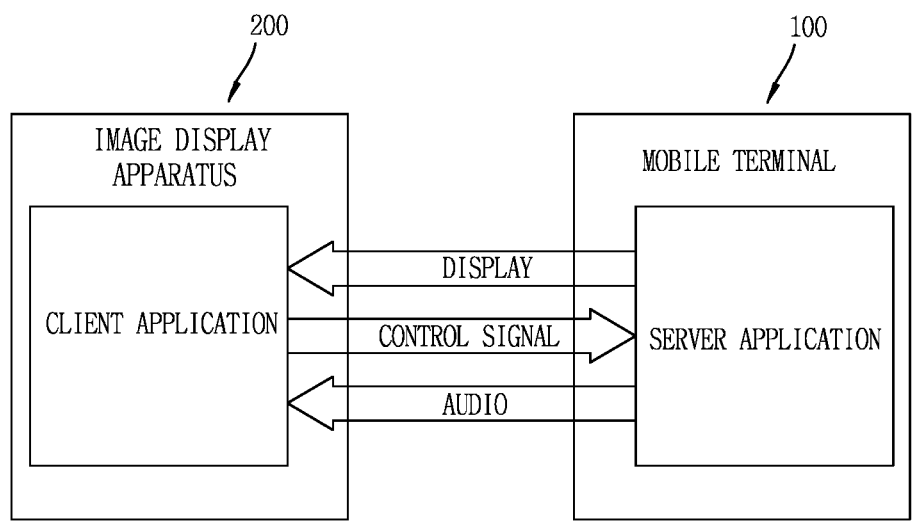
FIG. 1 is a view schematically showing an example of an image transmission system including a mobile terminal and an image display device according to an embodiment of the present invention.

FIG. 1 is a view schematically showing an example of an image transmission system including a mobile terminal and an image display device according to an embodiment of the present invention.

As shown in FIG. 1, the image transmission system according to an embodiment of the present invention includes a mobile terminal 100 and an image display device (or apparatus) 200.

The mobile terminal 100 may be connected to the image display device 200 through a fixed line or wirelessly to transmit at least one of an image and a voice to the image display device 200.

The image display device 200 may be mounted in a vehicle in a fixed manner, and may be connected to the mobile terminal 100 through a fixed line or wirelessly to receive at least one of an image and a voice from the mobile terminal 100. Also, the image display device 200 may output at least one of the image and voice that has been received from the mobile terminal 100.

The image display device 200 may receive a user input and transmit the received input to the mobile terminal 100. For example, when the user applies a touch input through a touch screen provided to the image display device 200, a position of a point to which the touch input has been applied in the image is recognized, the information regarding the recognized position may be transmitted to the mobile terminal 100.

Then, the mobile terminal 100 may determine that a touch event has occurred at the point at which the touch input has been applied, and may perform an operation corresponding to the generated touch event. Namely, the user may control the operation of the mobile terminal 100 by using a touch screen, a hard key, or the like provided to the image display device 200.

In an embodiment of the image transmission system, the user may execute a road guide application (or dialing, a phone book, an e-mail, a moving image play application, and the like) installed in the mobile terminal 100 and the mobile terminal 100 transmits an executed image of the road guide application to the image display device 200 so that the executed image of the road guide application can be displayed on the image display device 200.

The user can view the executed image of the road guide application on a large screen of the image display device 200 in the place of a small screen of the mobile terminal 100. Also, the user can listen to a road guide voice through a speaker provided to the vehicle in the place of a speaker of the mobile terminal 100.

Also, when the user selects a menu related to the road guide by using a touch screen or a hard key provided to the image display device 200, an operation with respect to the corresponding menu can be performed on the mobile terminal 100. The mobile terminal 100 may transmit the results of performing the operation with respect to the corresponding menu to the image display device 20 so that the image display device 200 can output the same.

The mobile terminal 100 and the image display device 200 may be connected by using a short-distance communication standard such as Bluetooth™, or the like, a wireless Internet standard such as Wi-Fi, or the like, an external device interface standard, such as USB (Universal Serial Bus), or the like.

A server application providing a service may be installed in the mobile terminal 100 and a client application allowing for a connection to a service provided by the server may be installed in the image display device 200 according to a client's request.

The server application of the mobile terminal 100 may capture an image of the screen of the mobile terminal 100 regardless of an application type of the mobile terminal 100 and transmit the captured image to the client application of the image display device 200. Also, the server application controls the operation of the mobile terminal 100 based on information regarding an event generated in the image display device 200 from the client application.

For example, the image display device 200 may remotely control the mobile terminal 100 according to a VNC (Virtual Network Computing) scheme using an RFB (Remote Frame Buffer) protocol providing a remote access to a graphic user interface. According to the VNC scheme, while the mobile terminal 100 is transferring screen update to the image display device, an input event generated by the image display device 200 is transmitted to the mobile terminal 100.

The mobile terminal 100 may transit a voice to the image display device 200, a headset, a hands free, or the like, according to, for example, an A2DP (Advanced Audio Distribution Profile) defining sound quality of an audio (stereo or mono) signal or output which can be streamed from a first device to a second device, an HSP (HeadSet Profile) regarding a Bluetooth headset, an HFP (HandsFree Profile) applied to a vehicle hands free kit, or the like.

Meanwhile, the mobile terminal 100 and the image display device 200 may exchange supplementary information based on a protocol. For example, the image display device 200 may provide vehicle status information such as vehicle travel information, speed information, fuel information, or the like, to the mobile terminal 100.

Some applications installed in the mobile terminal 100 may use the vehicle status information received from the image display device 200 by using a protocol. Also, the applications may provide information regarding the type of applications (e.g., a road guidance, multimedia, games, and the like), the type of a GUI (Graphic User Interface), the status of an application (e.g., whether or not an application is being executed at a foreground or a background), or the like.

Mobile Terminal

Figure 2:
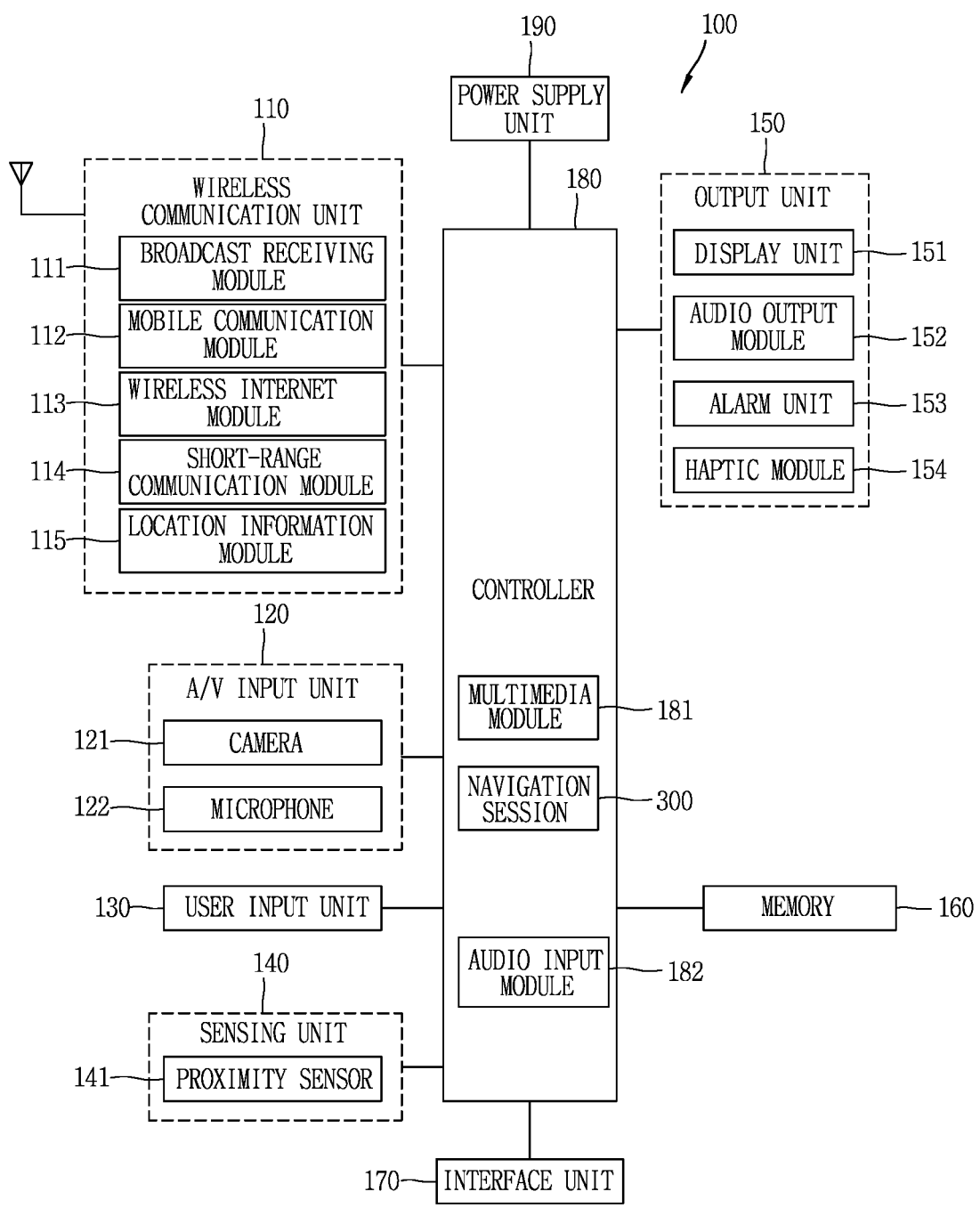
FIG. 2 is a schematic block diagram showing the configuration of a mobile terminal according to an embodiment of the present invention.

FIG. 2 is a schematic block diagram showing the configuration of a mobile terminal 100 according to an embodiment of the present invention. The mobile terminal 100 may be implemented in various forms. For example, the mobile terminal 100 may include mobile phones, smart phones, notebook computers, digital broadcast terminals, PDAs (Personal Digital Assistants), PMPs (Portable Multimedia Player), etc.

As shown in FIG. 2, the mobile terminal 100 may include a wireless communication unit 110, an A/V (Audio/Moving image) input unit 120, a user input unit 130, a sensing unit 140, an output unit 150, a memory 160, an interface unit 170, a controller 180, and a power supply unit 190, etc. The components as shown in FIG. 1 are not a requirement, and greater or fewer components may alternatively be implemented.

The wireless communication unit 110 may include one or more components allowing the mobile terminal 100 and a wireless communication system to perform radio communication or the mobile terminal 100 and a network in which the mobile terminal 100 is located to perform radio communication. For example, the wireless communication unit 110 may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a mobile terminal 100. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital moving image broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital moving image broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a moving image call signal or various types of data according to text and/or multimedia message transmission and/or reception.

The wireless Internet module 113 supports wireless Internet access for the mobile terminal 100. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, Wireless LAN, and the like.

The location information module 115 is a module for checking or acquiring a location (or position) of the mobile terminal 100. For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal 100 according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or hybrid positioning system may be used.

The A/V input unit 120 is configured to receive an audio or moving image signal. The A/V input unit 120 may include a camera 121 (or other image capture device) and a microphone 122 (or other sound pick-up device). The camera 121 processes image data of still pictures or moving image obtained by an image capture device in a moving image capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal 100.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal 100. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may be called a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, moving image I/O ports, earphone ports, or the like. Here, the identification module may be a memory chip (or other element with memory or storage capabilities) that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal 100 and an external device.

The output unit 150 is configured to provide outputs in a visual, audible, and/or tactile manner (e.g., audio signal, moving image signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a moving image call mode or image capturing mode, the display unit 151 may display a captured image and/or received image, a UI or GUI that shows moving images or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units (or other display means) according to its particular desired embodiment. For example, the mobile terminal 100 may include both an external display unit (not shown) and an internal display unit (not shown).

Meanwhile, when the display unit 151 and the touch pad are overlaid in a layered manner to form a touch screen, the display unit 151 may function as both an input device and an output device. The touch sensor may have the form of, for example, a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input position and a touch input area. When there is a touch input with respect to the touch sensor, the corresponding signal(s) are sent to a touch controller (not shown). The touch controller processes the signal(s) and transmits corresponding data to the controller 180. Accordingly, the controller 180 can recognize a touched region of the display unit 151.

The proximity sensor 141 may be may be disposed within the mobile terminal 100 covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The proximity sensor 141 may include, for example, a transmission type photo sensor, a direct reflection type photo sensor, a mirror-reflection type photo sensor, an RF oscillation type proximity sensor, a capacitance type proximity sensor, a magnetic proximity sensor, and an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal 100 may include call signal reception, message reception, key signal inputs, and the like. In addition to moving image or audio signals, the alarm unit 153 may output signals in a different manner, for example, to inform about an occurrence of an event. For example, the alarm unit 153 may output a signal in the form of vibration. When a call signal is received or a message is received, the alarm unit 153 may vibrate the mobile terminal 100 through a vibration means. Or, when a key signal is inputted, the alarm unit 153 may vibrate the mobile terminal 100 through a vibration means as a feedback with respect to the key signal input. Through the vibration, the user may recognize the occurrence of an event. A signal for notifying about the occurrence of an event may be output to the display unit 151 or to the voice output module 152.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. The haptic module 154 may be provided to a place that is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, moving image, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, moving image I/O ports, earphone ports, or the like. Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal 100 therethrough. Various command signals or power inputted from the cradle may operate as signals for recognizing that the mobile terminal 100 is properly mounted on the cradle.

The controller 180 typically controls the general operations of the mobile terminal 100. For example, the controller 180 performs controlling and processing associated with voice calls, data communications, moving image calls, and the like. The controller 180 may include a multimedia module 181 for reproducing multimedia data. The multimedia module 181 may be configured within the controller 180 or may be configured to be separate from the controller 180.

The controller 180 may also include an audio input module 182 that may recognize a voice spoken by a user and perform a corresponding function according to the recognized voice signal.

The controller 180 may also include a navigation session 300 that may be used to display a traveling path on map data.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself. For software implementation, the embodiments, such as procedures or functions described herein, may be implemented by separate software modules. Each software module may perform one or more functions or operations described herein. Software codes can be implemented by a software application written in any suitable programming language. The software codes may be stored in the memory 160 and executed by the controller 180.

Image Display Device

Figure 3:
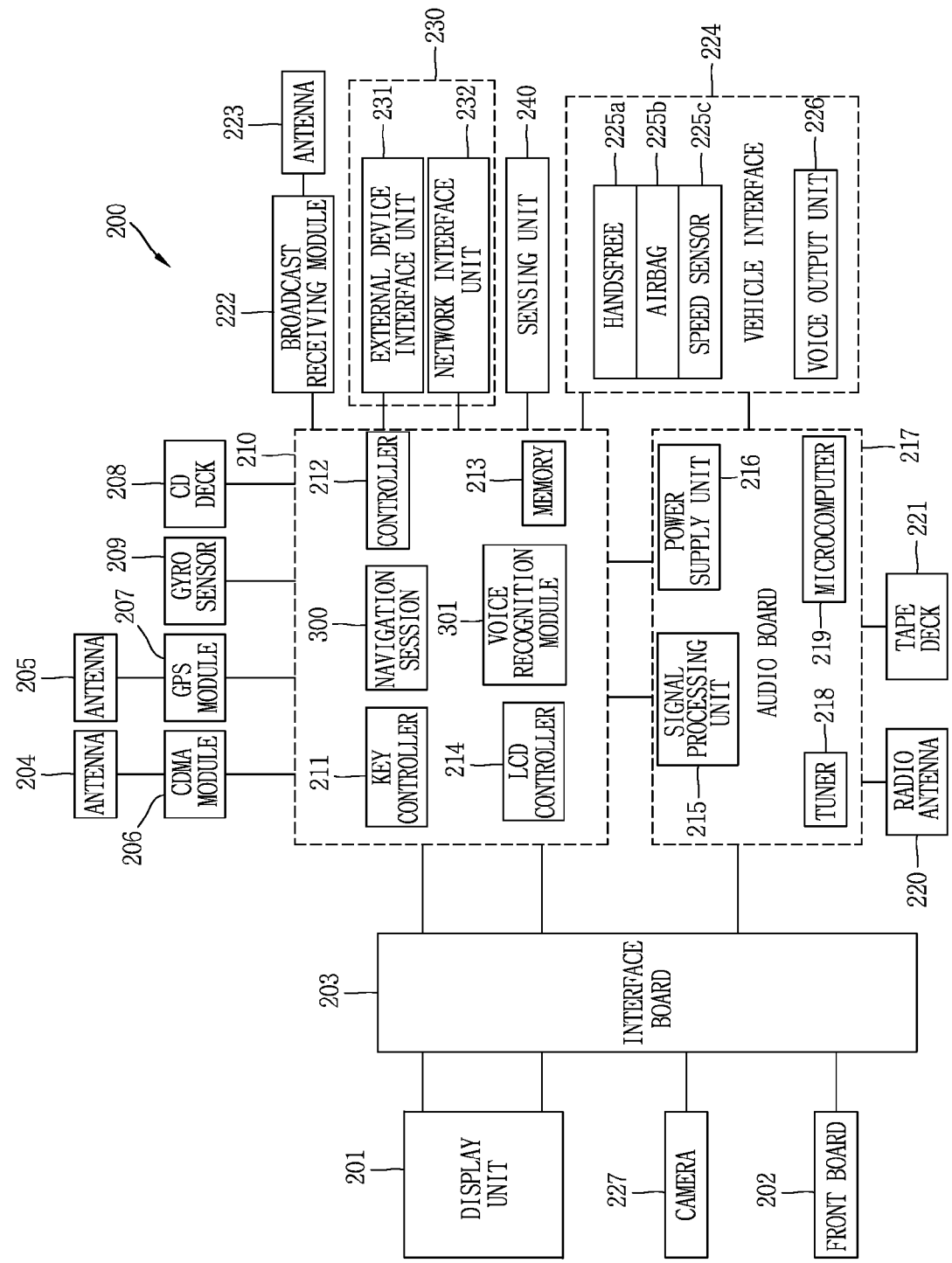
FIG. 3 is a block diagram showing an image display device according to an embodiment of the present invention.

FIG. 3 is a block diagram showing the image display device 200 according to an embodiment of the present invention.

As shown in FIG. 3, the image display device 200 includes a main board 210 including a CPU (Central Processing Unit) 212 for controlling a general operation of the image display device 200, a memory 213 for storing a processing and controlling program and input and output data, a key controller 211 for controlling various key signals, and an LCD controller 214 for controlling an LCD.

The memory 213 stores map information (map data) for displaying road guidance information on a digital map. Also, the memory 213 stores a traffic information collecting control algorithm for inputting traffic information according to the situation of a road along which the vehicle currently travels (runs), and information for controlling the algorithm.

The main board 210 may interface to a CDMA module 206, a mobile terminal 100 having a unique device number as assigned and installed in a vehicle, a GPS module 207 for guiding the location of the vehicle, receiving a GPS signal for tracking a travel route from a start point to a destination, or transmitting traffic information collected by the user as a GPS signal, a CD deck 208 for reproducing a signal recorded in a CD (Compact Disk), a gyro sensor 209, or the like. The CDMA module 206 and the GPS module 207 receive signals via antennas 204 and 205.

A broadcast receiving module 222 may be connected with the main board 210 and receive a broadcast signal via an antenna 223. A display unit (i.e., an LCD) 201 under the control of the LCD controller 214, a front board 202 under the control of the key controller 211, and a camera 227 for capturing images of the interior and/or the exterior of the vehicle are connected to the main board 210 via an interface board 203. The display unit 201 displays various moving image signals and character signals, and the front board 202 includes buttons for various key signal inputs and provides a key signal corresponding to a button selected by the user to the main board 210. Also, the display unit 201 includes a proximity sensor and a touch sensor (touch screen) of FIG. 2.

The front board 202 includes a menu key for directly inputting traffic information. The menu key may be controlled by the key controller 211.

The audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219, and a signal processing unit 215 for processing various voice signals.

The audio board 217 also includes a radio antenna 220 for receiving a radio signal and a tape deck 221 for reproducing an audio tape. The audio board 217 may further include a voice output unit (e.g., an amplifier) 226 for outputting a voice signal processed by the audio board 217.

The voice output unit (amplifier) 226 is connected to a vehicle interface 224. Namely, the audio board 217 and the main board 210 are connected to the vehicle interface 224. A hands free 225a for inputting a voice signal, an airbag 225b configured for the security of a passenger, a speed sensor 225c for detecting the speed of the vehicle, or the like, may be connected to the vehicle interface 224. The speed sensor 225c calculates a vehicle speed and provides the calculated vehicle speed information to the CPU 212.

The navigation session 300 applied to the image display device 200 generates road guidance information based on the map data and current location information of the vehicle and provides the generated road guidance information to the user.

The display unit 201 detects a proximity touch within a display window via a proximity sensor. For example, when a pointer (e.g., user's finger or stylus) is proximity-touched, the display unit 201 detects the position of the proximity touch and outputs position information corresponding to the detected position to the controller 212.

A voice recognition device (or a voice recognition module) 301 recognizes a voice pronounced by the user and performs a corresponding function according to the recognized voice signal.

The navigation session 300 applied to the image display device 200 displays a travel route on the map data, and when the mobile terminal 100 is located within a pre-set distance from a blind spot included in the travel route, the navigation session 300 automatically forms a wireless network together with a terminal (e.g., a vehicle navigation apparatus) mounted in a nearby vehicle or a mobile terminal 100 carried around by a nearby pedestrian via radio communication (e.g., a short-range wireless communication network) to receive location information of a nearby vehicle from the terminal mounted in the nearby vehicle and receive location information of the nearby pedestrian from the mobile terminal 100 carried around by the nearby pedestrian.

Meanwhile, the main board may be connected to the interface unit 230. The interface unit 230 includes an external device interface unit 231 and a network interface 232.

The external device interface unit 231 may connect an external device and the image display device 200. To this end, the external device interface unit 231 may include an A/V input/output unit (not shown) or a wireless communication unit (not shown).

The external device interface unit 231 may be connected to an external device such as a DVD (Digital Versatile Disk), Blu-ray, a game machine, a camera, a camcorder, a computer (or a notebook computer), and the like, through a fixed line or wirelessly. The external device interface unit 231 may deliver an image, voice, or data signal input from the exterior through the connected external device to the controller 212 of the image display device 200. Also, the external device interface unit 231 may output the image, voice, or data signal processed by the controller 212 to the connected external device. To this end, the external device interface unit 231 may include an A/V output unit (not shown) or a wireless communication unit (not shown).

The A/V input/output unit may include a USB terminal, a CVBS (Composite Moving image Banking Sync) terminal, a component terminal, an S-moving image terminal (analog), a DVI (Digital Visual Interface) terminal, an HDMI (High Definition Multimedia Interface) terminal, an RGB terminal, a D-SUB terminal, or the like, in order to input the image and voice signal of the external device to the image display device 200.

The wireless communication unit may perform short-range radio communication with a different electronic device. The image display device 200 may be connected to the different electronic device by a network according to a communication standard such as Bluetooth™, RFID (Radio Frequency Identification), IrDA (Infrared Data Association), UWB (Ultra Wideband), ZigBee™, DLNA (Digital Living Network Alliance), or the like.

Also, the external device interface unit 231 may be connected to various set-top boxes (STB) through at least one of and various terminals to perform an input or output operation with the STB.

Meanwhile, the external device interface unit 231 may receive an application or an application list from an adjacent external device and transfer the same to the controller 212 or the memory 213.

The network interface unit 232 provides an interface for connecting the image display device 200 to a wired/wireless network including the Internet. The network interface unit 232 may include, for example, an Ethernet terminal for a connection with the wired network, and may use a communication standard such as a wireless local area network (WLAN), wireless broadband (WiBro), world interoperability for microwave access (WiMAX), high speed downlink packet access (HSDPA), and the like, for a connection with the wireless network.

The network interface unit 232 may transmit or receive data to or from a different user or a different electronic device through a connected network or a different network linked to the connected network. In particular, a portion of contents data stored in the image display device 200 may be transmitted to a user or an electronic device selected from among different users or different electronic devices registered to the image display device 200.

Meanwhile, the network interface unit 232 may be connected to a certain web page through a connected network or a different network linked to the connected network. Namely, the network interface unit 232 may be connected to a certain Web page through a network to transmit or receive data to or from the corresponding server. Besides, the network interface unit 232 may receive contents or data provided by a contents provider or a network operator. Namely, the network interface unit 232 may receive contents such as movie, advertisements, games, VOID, a broadcast signal, or the like, provided from the contents provider or the network provider, and relevant information. Also, the network interface unit 232 may receive update information and an update file of firmware provided by a network operator. Also, the network interface unit 232 may transmit data to the contents provider or the network operator via the Internet.

Also, the network interface unit 232 may selectively receive an application among applications open to the public through a network.

Figure 4A:
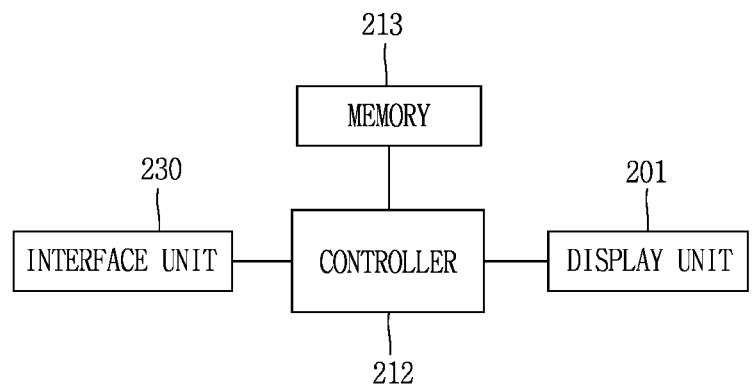
FIG. 4A is a schematic block diagram of the image display device according to an embodiment of the present invention.

FIG. 4A is a schematic block diagram of the image display device according to an embodiment of the present invention.

As shown in FIG. 4A, the image display device 200 may further include a controller 212, an interface unit 230, a display unit 201, or the like. Also, the image display device 200 may further include a memory 213. It is obvious to a skilled person in the art that the components illustrated in FIG. 4A are those for the sake of convenience of explanation, and the plurality of components illustrated in FIG. 3 may correspond to one of the components illustrated in FIG. 4A, and the function of one component illustrated in FIG. 3 may be separated to be implemented in the components illustrated in FIG. 4.

Also, all the components of the image display device 200 illustrated in FIG. 4A are not essential, and it is obvious to a skilled person in the art that the image display device may be implemented by more components or less components than those illustrated in FIG. 4A.

The components will now be described.

The interface unit 230 may receive an image with respect to an executed program and identification information regarding the program from the mobile terminal 100. The identification information may include at least one of: the type of the program, the content of the program, and information regarding a UI corresponding to the program.

For example, the type of the program may be a program for reproducing a moving image or a program for transmitting and receiving a text message. The content of the program may correspond to user's privacy.

Also, the interface unit 230 may transmit vehicle information of a vehicle in which the image display device is mounted to the mobile terminal 100. The vehicle information may include at least any one of the type of the vehicle, the speed of the vehicle, information regarding vehicle supplies, and trouble information of the vehicle.

The image display device 200 may obtain the vehicle information through the vehicle interface unit 224. For example, when the vehicle information is the speed of the vehicle, the speed of vehicle sensed by the speed sensor 225c may be obtained through the vehicle interface unit 224.

Also, the interface unit 230 may transmit various signals generated by the controller 212 to the mobile terminal 100. For example, the display unit 201 may detect a user's touch input via a UI optimized for the image display device 200. The UI optimized for the image display device 200 may be a UI that considers the size, resolution, and the like, of the display unit 201 of the image display device 200.

The controller 212 may generate a control signal for operating the mobile terminal 100 based on the touch input. Thereafter, the interface unit 230 may transmit the generated control signal to the mobile terminal 100.

The controller 212 performs various functions according to an embodiment of the present invention. The controller 212 may basically serve to control the display unit 201 to display the image received through the interface unit 230. Also, the controller 212 may determine an image processing scheme corresponding to the received image based on the identification information received from the mobile terminal 100.

The image processing scheme may be a scheme of displaying the received image with a substitute image. Also, the substitute image may include an indicator indicating the reason for displaying the image replacing the received image. The image substituting the received image may be previously stored in the memory unit 213. For example, when the program includes content related to user's (or driver's) privacy, the controller 212 may change the received image with the substitute image and display the substitute image.

According to a modification, the image display device 200 may be connected to a plurality of mobile terminals 100 through fixed lines or wirelessly. Users of the plurality of mobile terminals 100 may execute different applications.

For example, a first mobile terminal 100 used by a first user may reproduce moving image, and the reproduced moving image may be displayed on the entirety or a portion of the screen of the image display device 200. A second mobile terminal 100 used by a second user may execute an application for transmitting and receiving a text message. In this case, when the second mobile terminal 100 receives a text message from the exterior, the received text message may include content corresponding to second user's privacy. When the image display device 200 receives the identification information indicating that content corresponding to privacy from the second mobile terminal 100 of the second user, the image display device 200 may not display the received text message. In this case, the image display device 200 may display an indicator including a guide sentence indicating that the received text message cannot be displayed because it is related to privacy, in the place of the text message.

Also, the image processing scheme may be a scheme of determining whether or not the UI provided by the program is an access limited subject. When the UI is an access limited subject, the image processing scheme may be a scheme of processing such that an image stored in the memory unit 213 is displayed. For example, the access limited subject may be a subject having a maturity level or other characteristic that may be used to limit access.

In another example, the UI of the access limited subject may be a UI providing sub-menus having 3 depths or greater. In general, the UI providing a menu may include a plurality of sub-menus, and the sub-menus may have depth information corresponding to the sub-menus. The depth information may be the criterion indicating the depth (or layer) of the sub-menus. For example, a first sub-menu belonging to a main menu having depth information 1 may have depth information 2, and when the first sub-menu has another second sub-menu, the second sub-menu may have depth information 3.

Also, for example, the UI of the access limited subject may be a UI for showing a list (or data) having the amount of 3 pages or greater. In order for the user to view the entire content of the list having the amount of 3 pages or greater, the user must perform scrolling operation several times. Such a scrolling operation performed several times may interfere with the user's driving, so it may correspond with the travel regulation conditions. When the user selects the list in order to view the list having the amount of 3 pages or greater, the image display device 200 may display an indicator including a guide sentence that the state of the vehicle corresponds with the travel regulation conditions so the list having the amount of 3 pages or greater cannot be displayed.

Also, the image processing scheme may be a scheme of changing a component corresponding to the UI provided by the program based on pre-set configuration information and displaying the same on the image display device. The changing of the component corresponding to the UI may be changing of at least any one of the color, shape, size, position, and direction of the component. For example, the image display device 200 may magnify the size of the component and display it. Also, the image display device 200 may change the color of the component into a fluorescent color, or the like, such that the user (or driver) may easily recognize the UI visually even in a dark environment.

The changing of the component corresponding to the UI may aim at providing a UI optimized for the screen of the image display device 200.

The controller 212 may determine whether or not a state of the vehicle corresponds with the travel regulation conditions. When the vehicle corresponds with the travel regulation conditions, the controller 212 may process the received image according to the determined image processing scheme. The travel regulation conditions may be that the speed of the vehicle is a predetermined speed or higher. For example, the predetermined speed may be 5 miles an hour (8 kilometers an hour).

According to an embodiment, the controller 212 may determine the travel regulation conditions and change the UI provided by the program into a UI having a different form. For example, the UI provided by the program may be a keypad type UI. In this case, performing inputting through the keypad while the driver is running may correspond with the travel regulation conditions, causing user inconvenience. Thus, the controller 212 may determine whether or not the state of the vehicle corresponds with the travel regulation conditions, and when the state of the vehicle corresponds with the travel regulation conditions, the controller 212 may change the keypad type UI into a UI using a voice recognition and receives a user's voice input to operate the program.

To this end, the controller 212 may generate a control signal for changing the form of the UI through a keypad into a UI using a voice recognition. The controller 212 may transmit the control signal generated through the interface unit 230 to the mobile terminal 100. The mobile terminal 100 may change the UI through the keypad into the UI using a voice recognition based on the control signal. Thereafter, the mobile terminal 100 may receive a user's voice input from the image display device 200 and provide control to operate the program.

The display unit 201 may display the received image. Also, the display unit 201 may display image processed by the controller 212 according to the image processing scheme. Also, the display unit 201 may detect a proximity touch within a display window through a proximity sensor and detect the position of the proximity touch to thus receive the user's touch input.

The memory 213 may store the image received through the interface unit 230. Also, the memory 213 may store the processed image according to the image processing scheme under the control of the controller 212.

Also, the memory 213 may store an image replacing the received image. The controller 212 may replace the received image with the image stored in the memory 213.

Figure 4B:
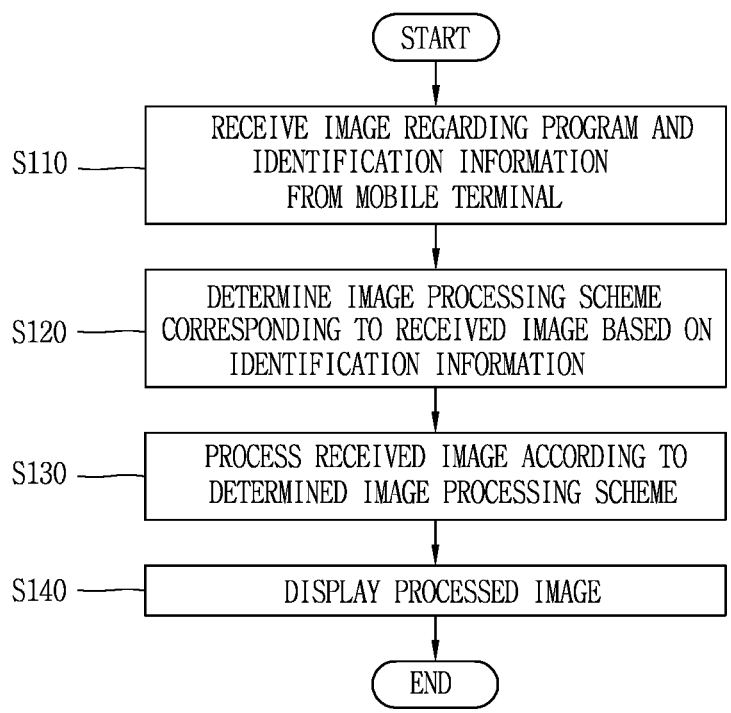
FIG. 4B is a flow chart illustrating the process of controlling an operation of the image display device according to an embodiment of the present invention.

FIG. 4B is a flow chart illustrating the process of controlling an operation of the image display device according to an embodiment of the present invention. The devices of FIGS. 1-4A may be used for the method of FIG. 4B.

The interface unit 230 may receive an image with respect to a program and identification information corresponding to the program (step S110). For example, the image with respect to the program may be a moving image execution image, a Web page image, an image showing content of a text message, a navigation execution image, or an image provided by a UI.

For example, the identification information of the program may include at least one of a type of the program, content of the program, and a UI corresponding to the program.

The controller 212 may determine an image processing scheme corresponding to the received image based on the received identification information (step S120). Also, the controller 212 may process the received image according to the determined image processing scheme (step S130).

The display unit 201 may display the processed image (step S140).

First Embodiment

Figure 5:
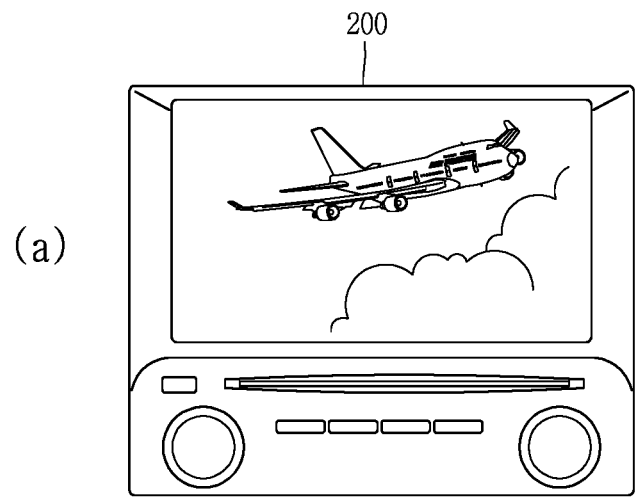
FIG. 5 is a view showing the process of controlling an operation of the image display device according to a first embodiment of the present invention.
Figure 5:
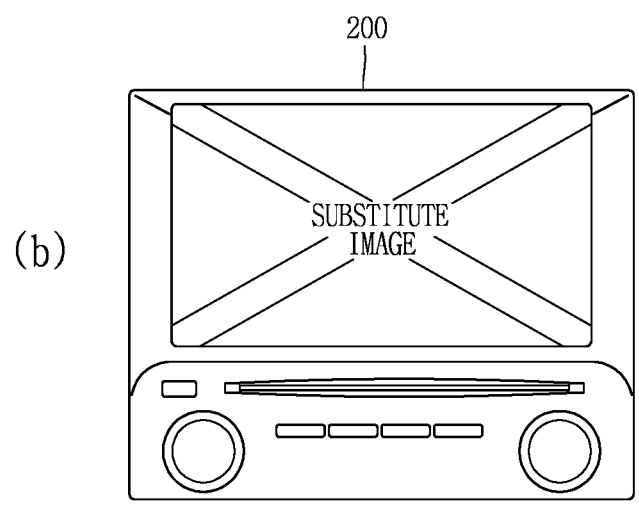

FIG. 5 is a view showing the process of controlling an operation of the image display device according to a first embodiment of the present invention.

With reference to FIG. 5(*a*), the interface unit 230 may receive an image with respect to a program from the mobile terminal 100. The display unit 201 may display the received image on the screen of the image display device 200.

Also, the interface unit 230 may receive identification information corresponding to the program from the mobile terminal 100. For example, the identification information may include at least one of a type of the program, content of the program, and a UI provided by the program. In FIG. 5(*a*), the identification information may indicate that the type of the program is a program for reproducing a moving image.

When the state of the vehicle corresponds with the travel regulation conditions, the image display device provided in the vehicle may be required to interrupt with the image received from the mobile terminal 100. This is to prevent the user (or driver) of the image display device provided in the vehicle from being interference with while he is driving. The travel regulation conditions may be that the speed of the vehicle may be a predetermined speed or higher.

When the interface unit 230 receives the identification information indicating that the received image is a moving image, the controller 212 determines an image processing scheme with respect to the received image based on the received identification information. Determining an image processing scheme by the controller 212 may include the meaning that the controller 212 applies a predetermined image processing scheme. Thus, the determining the image processing scheme by the controller 212 and processing the received image according to the determined image processing scheme may mean that the received image is processed according to the predetermined image processing scheme.

The image processing scheme may be a scheme of replacing the received image with the image stored in the memory 213 and displaying the stored image. The substitute image may include an indicator indicating the reason for displaying the substitute image in the place of the received image. For example, since the user is driving, the indicator may be configured as a guide sentence indicating that displaying of the received image is blocked (or interrupted). In FIG. 5(*b*), the substitute image includes an X-shaped diagram.

Figure 6:
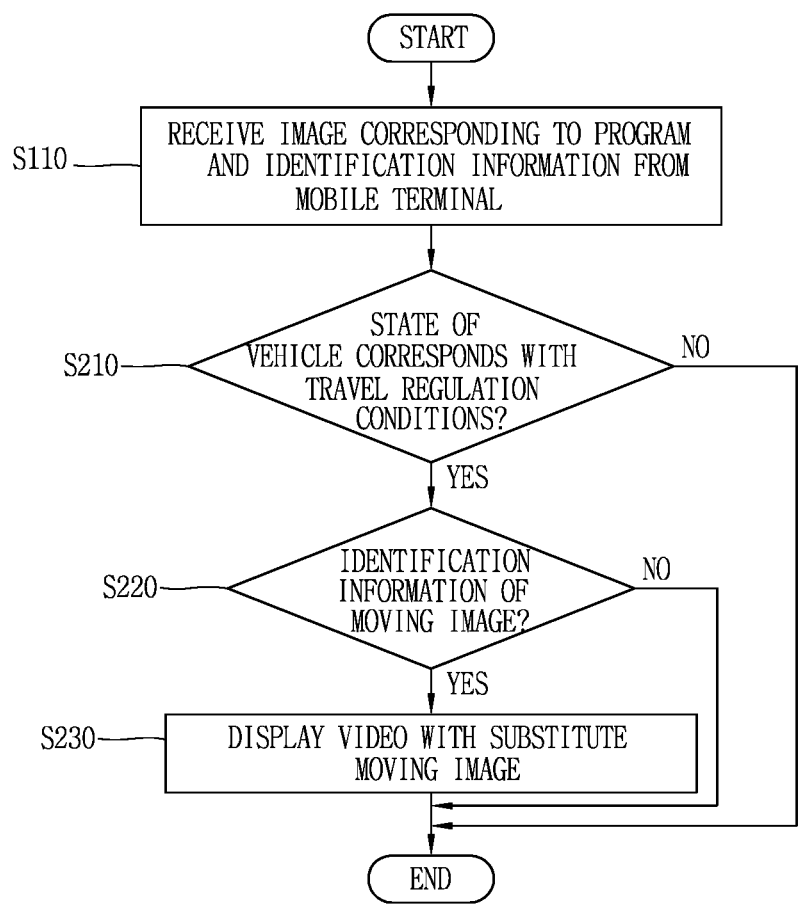
FIG. 6 is a flow chart illustrating the process of controlling an operation of the image display device according to the first embodiment of the present invention.

FIG. 6 is a flow chart illustrating the process of controlling an operation of the image display device according to the first embodiment of the present invention. The devices of FIGS. 1-4A may be used for the method of FIG. 6.

The interface unit 230 may receive an image with respect to a program and identification information corresponding to the program from the mobile terminal 100 (step S110).

The controller 212 may determine whether or not a state of the vehicle corresponds with the travel regulation conditions (step S210). When the state of the vehicle corresponds with the travel regulation conditions based on the determination results, the controller may check the identification information corresponding to the program (step S220).

When the identification information indicates that a moving image is being executed when the state of the vehicle corresponds with travel regulation conditions, the controller 212 may replace the received image with an image previously stored in the memory 213 and display the substitute image (step S230).

When the state of the vehicle does not correspond with the travel regulation conditions or when the identification information indicates that a moving image is not executed, the process of controlling the operation of the image display device 200 is terminated and the display unit 201 displays the received image as it is.

Second Embodiment

Figure 7:
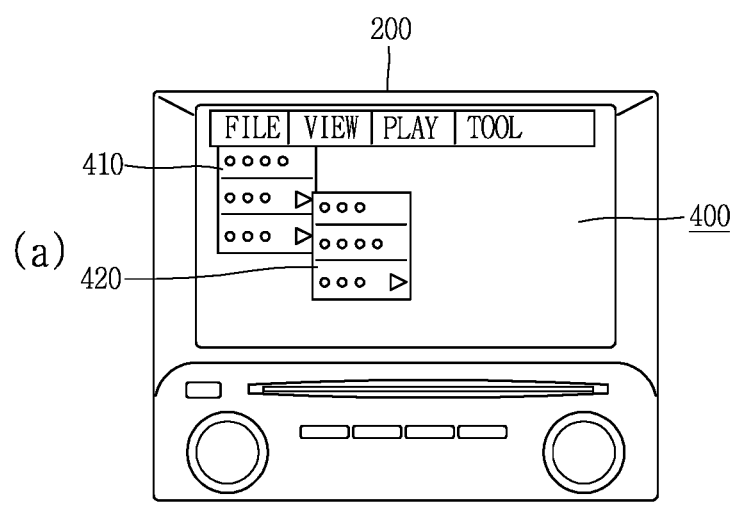
FIG. 7 is a view showing the process of controlling an operation of the image display device according to a second embodiment of the present invention.
Figure 7:
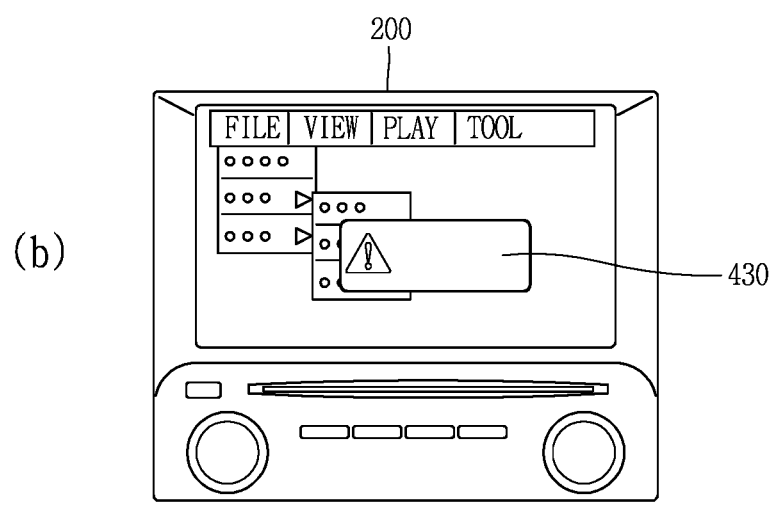

FIG. 7 is a view showing the process of controlling an operation of the image display device according to a second embodiment of the present invention.

With reference to FIG. 7(a), the image display device 200 receives and displays an image corresponding to the UI provided by the program from the mobile terminal 100. The image corresponding to the UI includes a menu screen image. The menu may include a plurality of sub-menus, and the sub-menus may have corresponding depth information. The depth information may be a criterion indicating the depth (or layer) of the sub-menus. With reference to FIG. 7(a), the display unit 201 displays a first menu 410 and a second menu 420 of a 'file' menu. The depth information of the first menu may be 1 and that of the second menu may be 2.

In this case, when the state of the vehicle corresponds with the travel regulation conditions, the controller 212 may check the information regarding the UI provided by the program from the received identification information.

For example, when the user (or driver) selects, while driving, a third sub-menu (not shown) having depth information 3, the information regarding the UI provided by the program may be information indicating that the third-menu having depth information 3 has been selected. The controller 212 may provide control not to display the third sub-menu based on predetermined configuration information. For example, the predetermined configuration information may be information indicating that the sub-menu is not to be displayed on the screen when the sub-menu having depth information 3 or greater is selected while driving.

With reference to FIG. 7(b), when the third sub-menu is selected while driving, the controller 212 may display an indicator 430 informing that the sub-menu having depth information 3 or greater cannot be selected while the user is driving, rather than displaying the third sub-menu.

Second Embodiment

Figure 8:
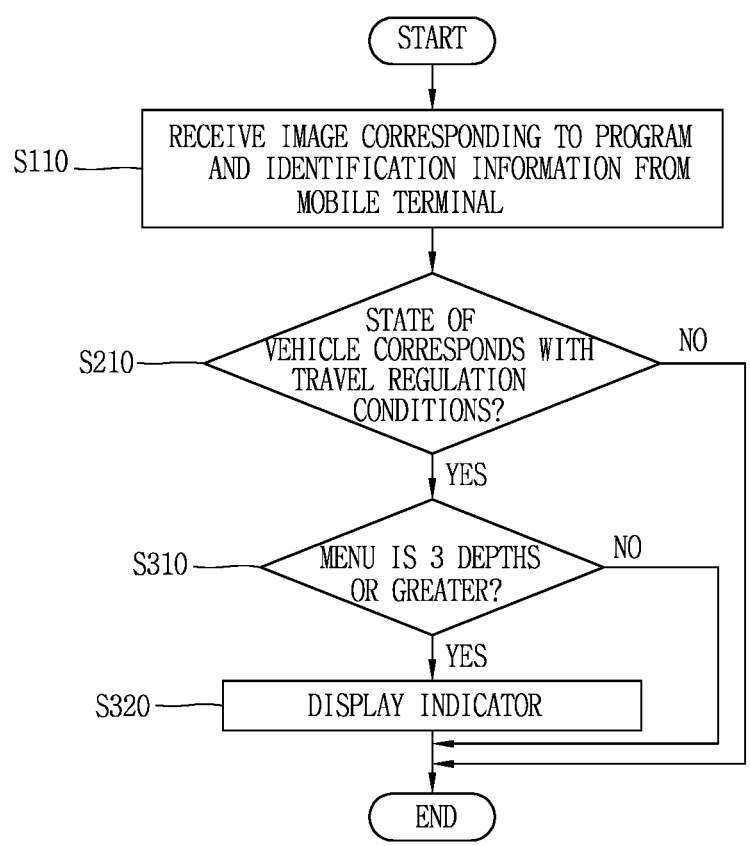
FIG. 8 is a flow chart illustrating the process of controlling an operation of the image display device according to the second embodiment of the present invention.

FIG. 8 is a flow chart illustrating the process of controlling an operation of the image display device according to a second embodiment of the present invention. The devices of FIGS. 1-4A may be used for the method of FIG. 8.

The interface unit 230 may receive an image with respect to a program and identification information corresponding to the program from the mobile terminal 100 (step S110).

The controller 212 may determine whether or not the state of the vehicle corresponds with travel regulation conditions (step S210). When the state of the vehicle corresponds with travel regulation conditions, the controller 212 may determine whether or not a menu provided by the program has 3 depths or greater (step S310).

When the menu provided by the program has 3 depths or greater, and when the state of the vehicle corresponds with travel regulation conditions, the controller 212 may provide control not to display the menu, and instead, display the indicator 430 indicating the reason for not displaying the menu on the screen (step S320).

When the state of the vehicle does not correspond with travel regulation conditions or when the menu does not have 3 depths or greater, the process of controlling the operation of the image display device 200 is terminated.

Third Embodiment

Figure 9:
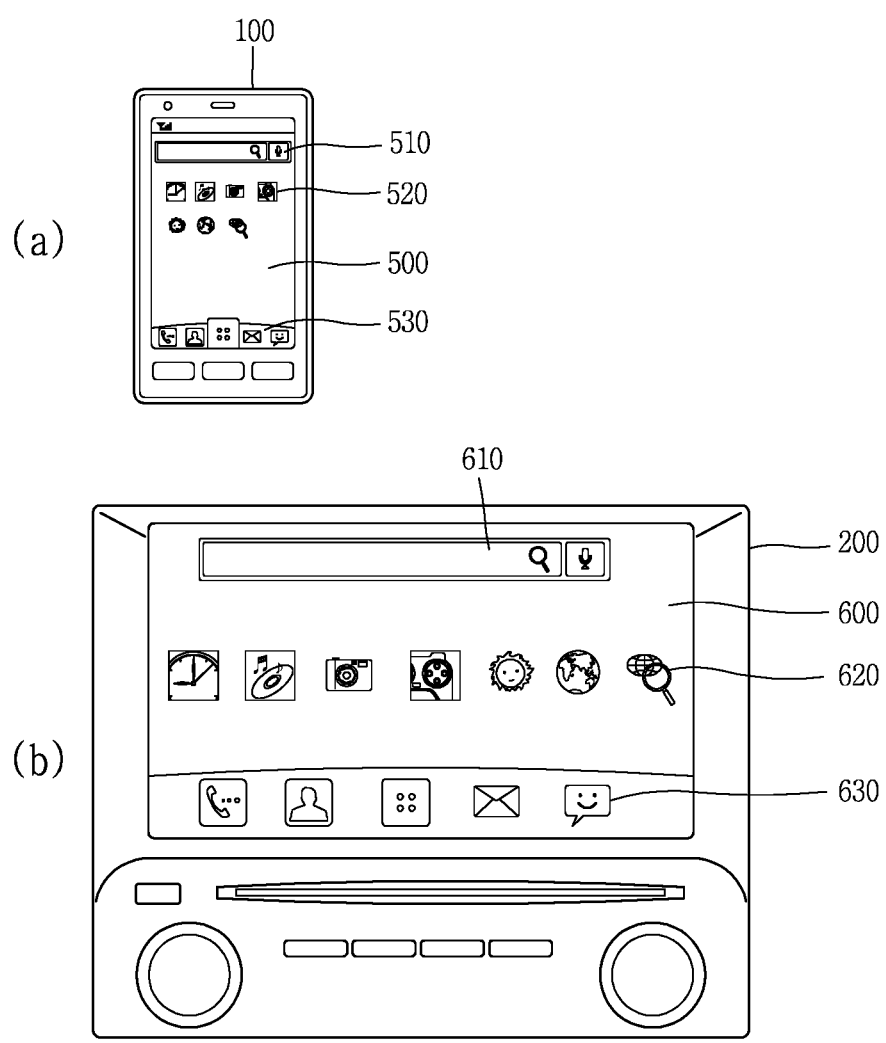
FIG. 9 is a view showing the process of controlling an operation of the image display device according to a third embodiment of the present invention.

FIG. 9 is a view showing the process of controlling an operation of the image display device according to a third embodiment of the present invention.

With reference to FIG. 9(a), the mobile terminal 100 displays a UI 500 that includes UI components. Here, the UI components may include a search window 510, icons 520 corresponding to applications, soft buttons 530, and the like.

The UI 500 is optimized for the mobile terminal 100. Thus, when a corresponding UI 600 is to be displayed on the image display device 200, the image display device 200 may change aspects of the UI components based on certain configuration information of the UI components so as to be optimized for the image display device 200. The certain configuration information may be information regarding the screen of the image display device 200. The certain configuration information regarding the screen may include a resolution and size of the screen, coordinates at which the UI components may be positioned, and a magnification ratio with respect to the UI components.

The UI 600 may differ from the UI 500 by changing the UI components included in the UI 500. Changing of the UI components may include changing at least any one of the color, shape, size, position, and direction of the UI components.

For example, the image display device 200 may magnify the size of the UI components. Here, the image display device 200 may determine the magnification ratio of the UI components in consideration of the size ratio between the image display device 200 and the mobile terminal 100, and magnify and display the components.

With reference to FIG. 9(b), the image display device 200 may display a changed UI 600 on the screen. Like the UI 500 of the mobile terminal 100, the changed UI 600 includes a search window 610, icons 620 corresponding to the applications, and soft buttons 630 as components.

The components 610, 620, and 630 of the changed UI 600 are those displayed upon magnifying the search window 510, the icons 520 corresponding to the applications, and the soft buttons 530 of the mobile terminal 100. Also, the icons 620 corresponding to the applications are optimized to the screen of the image display device 200 such that their positions are partially changed to be displayed.

Also, the UI 600 may be changed variably on the image display device 200. For example, the search window 610, the icons 620 corresponding to applications, and the soft buttons 630, components of the UI 600, may be reduced in size according to user manipulation while driving.

Also, when the UI 600 is changed as described above, the image display device 200 may receive a user input signal through the changed UI 600. In this case, the image display device 200 may operate a program executed within the mobile terminal 100 based on the received input signal.

For example, the soft buttons 530, components of the mobile terminal 100, may be magnified to be displayed as soft buttons 630 on the image display device 200. Coordinates on the screen of the image display device 200 where the magnified soft buttons 630 are positioned may be different from the coordinates on the screen of the mobile terminal 100 where the soft buttons 530 are positioned. In this case, the image display device 200 may be able to receive a user's selection input, or the like, based on the changed position coordinates. Here, the selection input may be a touch input detected by the display unit 201.

Also, when the user's touch input received through the changed UI 600 is detected; the image display device 200 may provide control to operate the programs executed in the mobile terminal 100 based on the detected touch input. To this end, the controller 212 may recognize the user's touch input based on the changed position coordinates and generate a signal for controlling the components corresponding to the UI 600 based on the touch input.

The interface unit 230 may transmit the generated signal to the mobile terminal 100. The mobile terminal 100 may provide control to operate the program based on the transmitted signal.

Figure 10:
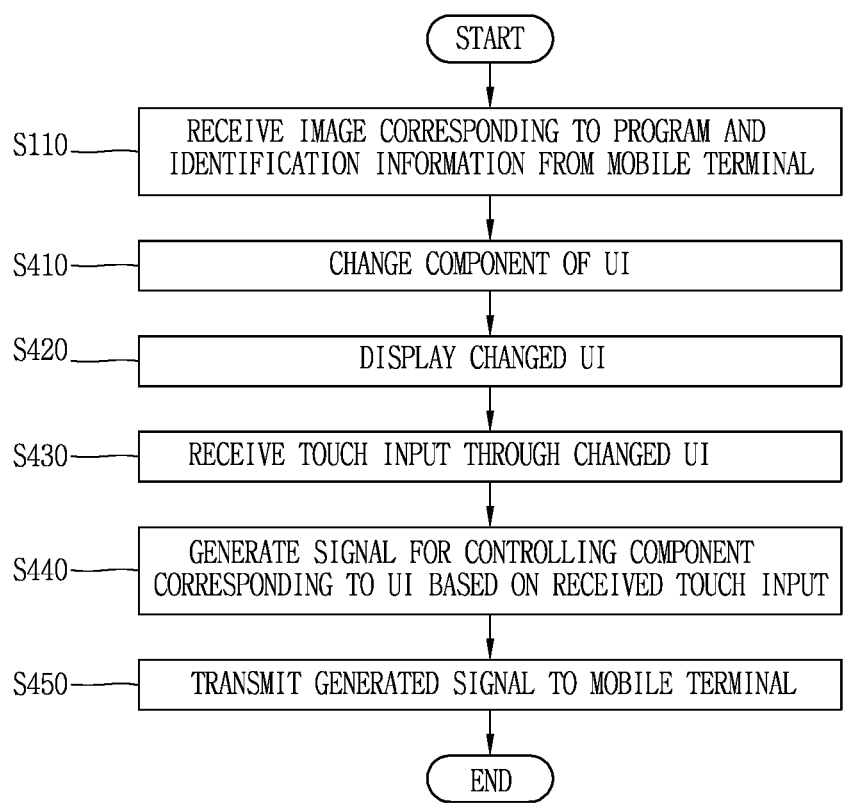
FIG. 10 is a flow chart illustrating the process of controlling an operation of the image display device according to the third embodiment of the present invention.

FIG. 10 is a flow chart illustrating the process of controlling an operation of the image display device according to the third embodiment of the present invention. The devices of FIGS. 1-4A may be used for the method of FIG. 10.

The interface unit 230 may receive an image with respect to a program and identification information corresponding to the program from the mobile terminal 100 (step S110).

When the identification information is information regarding the components of the UI provided by the program, the controller 212 may change the components of the UI (step S410).

The display unit 201 may display the changed UI (step S420).

In this case, the display unit 201 may receive a touch input through the changed UI (step S430). The controller 212 may generate a signal for operating the program according to the received touch input (step S440).

The interface unit 230 may transmit the generated signal to the mobile terminal 100 (step S450). When the signal is transmitted, the process of controlling the operation of the image display device 200 is terminated. Thereafter, the mobile terminal 100 may provide control to operate the program based on the transmitted signal.

Fourth Embodiment

Figure 11:
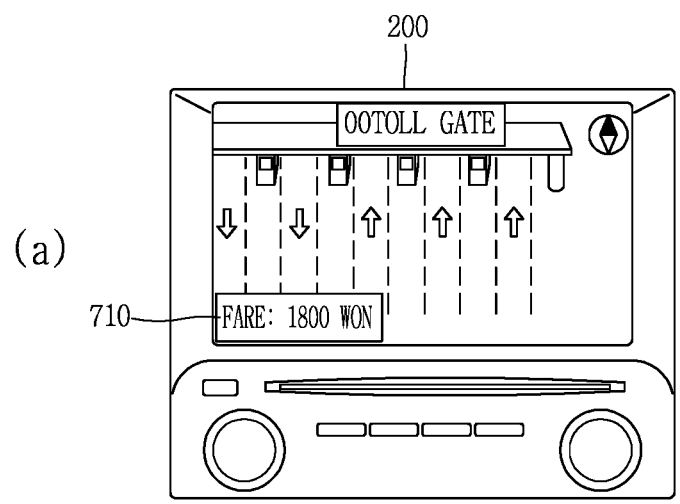
FIG. 11 is a view showing the process of controlling an operation of the image display device according to a fourth embodiment of the present invention.
Figure 11:
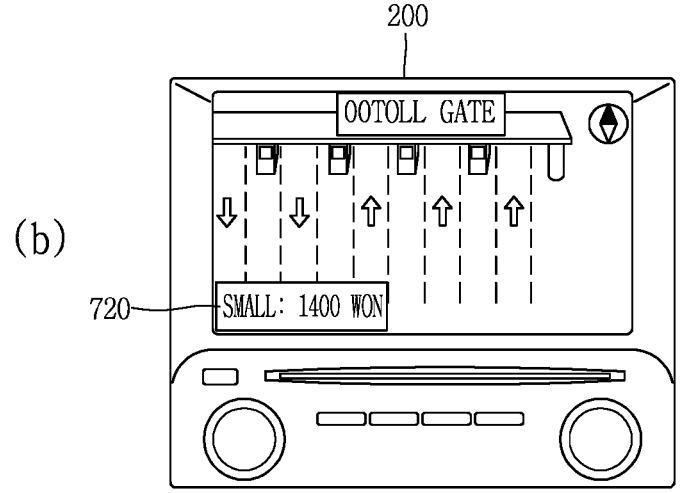

FIG. 11 is a view showing the process of controlling an operation of the image display device according to a fourth embodiment of the present invention.

With reference to FIG. 11(*a*), the image display device 200 receives an image of executing navigation from the mobile terminal 100 and displays it. For example, when the vehicle approaches a tollgate, the navigation may display fare information 710 to be paid to the tollgate. In FIG. 11(*a*), the navigation calculates the tollgate fare as $1.80 that corresponds to a midsize vehicle, and the image display device 200 receives the corresponding image from the mobile terminal 100 and displays it.

With reference to FIG. 11(*b*), the mobile terminal 100 according to an embodiment of the present invention may receive vehicle information regarding a vehicle having the image display device 200 from the image display device 200. For example, the vehicle information may include at least any one of the type of the vehicle, the speed of the vehicle, information regarding vehicle supplies, and trouble information of the vehicle.

FIG. 11(*b*) shows a case in which the vehicle information is a vehicle type. For example, the type of the vehicle may be a small car.

The controller 180 of the mobile terminal 100 may select a program related to the vehicle based on the vehicle information. For example, the controller 180 may collect a list (or data) with respect to vehicle information required for the program from the program related to the vehicle. The controller 180 may determine whether or not the received vehicle information is included in the list with respect to the vehicle information. When the received vehicle information is included in the list with respect to the vehicle information, the controller 10 may select the program related to the vehicle.

The controller 180 may transfer the received vehicle information to the selected program. The selected program may generate an image using the transferred vehicle information. For example, the selected program may generate an image displaying the fare information 720 using the vehicle information. For example, when information that the vehicle is a small car is checked, the program may calculate the tollgate fare as 1400 Won corresponding to the small car, rather than 1800 Won corresponding to midsize vehicle and display the same.

The controller 180 may provide control to transmit the generated image to the image display device 200. Thereafter, the image display device 200 may display the transmitted image.

In a modification, the vehicle information may indicate fuel state of the vehicle. In this case, when the fuel of the vehicle is insufficient, the navigation may generate an image for automatically guiding the user to a nearby gas station.

In a modification, the vehicle information may be trouble information of the vehicle. In this case, the program related to the vehicle may be a reservation service program related to vehicle maintenance. For example, the controller may transfer vehicle information indicating that the engine of the vehicle is broken down to the program. Then, the program may transmit the vehicle information to a predetermined service center (or garage) to make a reservation for a maintenance service and generate an image related to the reservation.

Also, in a modification, the vehicle information may be a charge state of an electric vehicle. In this case, a program related to the vehicle may be a charge reservation service program of the electric vehicle. For example, the controller 180 may transfer information indicating that a charged state of the electric vehicle is insufficient to the program. Then, the program may generate an image displaying information regarding a predetermined charging station or the closest charging station.

FIG. 12 is a flow chart illustrating the process of controlling an operation of the image display device according to the fourth embodiment of the present invention. The devices of FIGS. 1-4A may be used for the method of FIG. 12.

The mobile terminal 100 may receive vehicle information regarding the vehicle from the image display device 200 (step S510).

The controller 180 may select a program related to the vehicle based on the received vehicle information (step S520). Also, the controller 180 may transfer the vehicle information to the selected program (step S530).

Also, the controller 180 may provide control to allow the program to generate an image based on the vehicle information (step S540). Also, the controller 180 may provide control to transmit the generated image to the image display device 200 (step S550). The controls used by the mobile terminal 100 with the vehicle information may be preset or may be user selectable. These controls may include privacy settings, content settings or other settings.

After the generated image is transmitted to the image display device 200, the process of controlling the operation of the mobile terminal 100 may be terminated or may continue as long as the corresponding program is being executed by the mobile terminal 100.

According to embodiments of the present invention, the image display device including various image processing schemes is provided to allow a user to conveniently and effectively check an image provided from a mobile terminal 100 in a vehicle. In particular, the user can stably and conveniently check information included in an image provided from the mobile terminal 100 through the image display device 200 while he is driving.

Meanwhile, the method for controlling the operation of the image display device according to an embodiment of the present invention can be implemented as codes that can be read by a processor in a program-recorded medium. The processor-readable recording medium may include a ROM, a RAM, a CD-ROM, a magnetic tape, a floppy disk, an optical data storage device, and the like. Also, codes, which are distributed in computer devices connected by a network and can be read by a computer in a distributed manner, are stored and executed in the processor-readable recording medium.

As the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. An image display device configured to be installed in a vehicle, comprising:
   a display unit;
   a vehicle interface unit;
   a wireless communication unit; and
   a controller operatively connected to the display unit, the vehicle interface unit and the wireless communication unit, the controller configured to
   wirelessly receive, from a mobile terminal, data of a program being executed on the mobile terminal and corresponding program information,
   display the data on the display unit,
   receive vehicle status information from the vehicle interface unit, and
   change the display of the data of the program being executed on the mobile terminal based on the corresponding program information and the vehicle status information.

2. The image display device of claim 1,
   wherein the displayed data is video data being displayed on the mobile terminal, the received program information is video processing information, and the vehicle status information is a speed of the vehicle, and
   wherein the controller is configured to control the display unit to replace the display of the video data with a static display when the speed is greater than a predetermined speed.

3. The image display device of claim 1,
   wherein the displayed data is message data of the mobile terminal, the received program information is message processing information, and the vehicle status information is a speed of the vehicle, and
   wherein the controller is configured to interrupt the display of the message data on the display unit when the speed is greater than a predetermined speed.

4. The image display device of claim 1,
   wherein the displayed data is menu data of the program executed on the mobile terminal, the received program information is menu processing information, and the vehicle status information is a speed of the vehicle, and
   wherein the controller is configured to disable a portion of the display of the menu data on the display unit when the speed is greater than a predetermined speed.

5. The image display device of claim 4, wherein the received program information includes menu depth information.

6. The image display device of claim 5, wherein the controller is configured to prevent a display on the display unit of a menu item having a menu depth of three or higher.

7. The image display device of claim 1, wherein the received program information is privacy information.

8. The image display device of claim 1, wherein the controller is configured to display an indicator with the static image, the indicator indicating a reason why the display of the data is changed.

9. The image display device of claim 1,
   wherein the program information includes one of icon location information and icon display characteristic information for an icon displayed on the mobile terminal, and
   wherein the controller is configured to change the one of icon location information and icon display characteristic information prior to displaying the icon on the display unit.

10. The image display device of claim 9, further comprising:
    an input device configured to receive one of a touch input and a voice input,
    wherein the controller is configured to control the program being executed on the mobile terminal via a command received via the input device.

11. A method of controlling an image display device installed in a vehicle, the method comprising:
    wirelessly receiving, from a mobile terminal, data of a program being executed on the mobile terminal and corresponding program information;
    displaying the data of the program being executed on the mobile terminal on the image display device;
    receiving vehicle status information; and
    changing the display of the data of the program being executed on the mobile terminal based on the corresponding program information and the vehicle status information.

12. The method of claim 11,
    wherein the displayed data is video data being displayed on the mobile terminal, the received program information is video processing information, and the vehicle status information is a speed of the vehicle, and
    wherein the method further comprises replacing the display of the video data with a static display when the speed is greater than a predetermined speed.

13. The method of claim 11,
    wherein the displayed data is message data of the mobile terminal, the received program information is message processing information, and the vehicle status information is a speed of the vehicle, and wherein the method further comprises interrupting the display of the message data when the speed is greater than a predetermined speed.

14. The method of claim 11,
wherein the displayed data is menu data of the program executed on the mobile terminal, the received program information is menu processing information, and the vehicle status information is a speed of the vehicle, and
wherein the method further comprises disabling a portion of the display of the menu data when the speed is greater than a predetermined speed.

15. The method of claim 14, wherein the received program information includes menu depth information.

16. The method of claim 15, wherein the method of disabling a portion of the display of the menu data comprises:
preventing a display on the display unit of a menu item having a menu depth of three or higher.

17. The method of claim 11, wherein the received program information is one of privacy information or content information.

18. The method of claim 11, further comprising:
displaying an indicator with the static image, the indicator indicating a reason why the display of the data is changed.

19. The method of claim 11,
wherein the program information includes one of icon location information and icon display characteristic information for an icon displayed on the mobile terminal, and
wherein the method further comprises changing the one of icon location information and icon display characteristic information prior to displaying the icon on the image display device.

20. The method of claim 19, further comprising:
receiving one of a touch input and a voice input; and
controlling the program being executed on the mobile terminal via a command received via the input device.

21. A mobile terminal, comprising:
a wireless communication unit;
a display; and
a controller operatively connected to the wireless communication unit and the display, the controller configured to
execute a program,
wirelessly transmit data of the program to an image display device installed in a vehicle,
receive vehicle status information from the vehicle, and
control the image display device to change a display of the transmitted data based on the corresponding program information and the received vehicle status information.

22. The mobile terminal of claim 21,
wherein the transmitted data is video data being displayed on the mobile terminal, and the received vehicle status information is a speed of the vehicle, and
wherein the controller is configured to replace the transmitted video data with a static image when the speed is greater than a predetermined speed.

23. The mobile terminal of claim 21,
wherein the transmitted data is message data of the mobile terminal, and the received vehicle status information is a speed of the vehicle, and
wherein the controller is configured to interrupt the transmitted message data when the speed is greater than a predetermined speed.

24. The mobile terminal of claim 21, wherein the program information is privacy information or content information.

* * * * *